Figure 1:
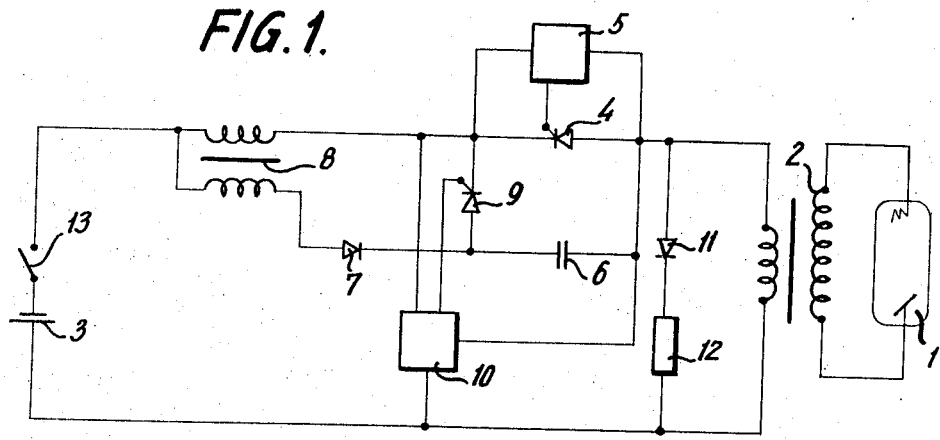

United States Patent
Jakobsen

[15] 3,663,942
[45] May 16, 1972

[54] CIRCUIT ARRANGEMENT FOR TRANSFORMING THE VOLTAGE OF A DC VOLTAGE SOURCE INTO A PULSATING VOLTAGE

[72] Inventor: Niels Jakobsen, Kastrup, Denmark
[73] Assignee: Picker-Andrex X-ray A/S, Copenhagen, Denmark
[22] Filed: Oct. 30, 1970
[21] Appl. No.: 85,632

[30] Foreign Application Priority Data
Nov. 7, 1969 Denmark..........................5914/69

[52] U.S. Cl. ..............................321/14, 250/102, 321/45 C, 323/18
[51] Int. Cl. ..............................................H02m 1/18, G05f
[58] Field of Search................321/2, 11, 14, 45, 45 C, 45 R; 318/341, 301; 323/18, 22 SC; 250/102, 103

[56] References Cited
UNITED STATES PATENTS
3,444,453 5/1969 Peterson..................................321/11

FOREIGN PATENTS OR APPLICATIONS
1,413,764 8/1965 France.................................321/45 C
1,063,733 3/1967 Great Britain.......................321/45 C
1,114,102 5/1968 Great Britain............................321/2

OTHER PUBLICATIONS
Electronic Design, " Disregard Load Impedance in SCR Inverter Design," Vol. 11, pp. 68- 72, May 24, 1967

*Primary Examiner*—William H. Beha, Jr.
*Attorney*—Sughrue, Rothwell, Mion, Zinn & Macpeak

[57] ABSTRACT

A circuit arrangement for supplying a load, e.g. an X-ray tube, with a pulsating voltage by means of a DC voltage source connected in series with the load and a controllable rectifier, which is extinguished by means of the charge on a commutating capacitor, which, via a current transformer, is charged by the leading edges of the load current, and the discharge of which is controlled, via a timing device, by the voltage across the commutating capacitor. Means may be provided for reducing the time constant of the timing device when the load current exceeds a given value.

5 Claims, 3 Drawing Figures

CIRCUIT ARRANGEMENT FOR TRANSFORMING THE VOLTAGE OF A DC VOLTAGE SOURCE INTO A PULSATING VOLTAGE

The present invention relates to a circuit arrangement for transforming the voltage of a DC voltage source into a pulsating voltage which is supplied to a load that is series-connected with the DC voltage source and a controllable rectifier having an associated first timing device for determining the moments of ignition of the rectifier, said circuit arrangement comprising a commutation capacitor which, via a current transformer and a rectifier, is charged by the leading edges of the pulsating load current and the charge of which is supplied, via a controllable switch, the closing of which is controlled by a second timing device, to the controllable rectifier for extinguishing same.

Circuits of this type, so-called "Jones Choppers", may, for instance, be employed for operating electromotors, since they provide a smooth speed regulation with slight losses.

They are also eminently suitable for operating X-ray equipment from batteries, since certain advantages are derived from supplying the X-ray tube with a pulsating DC voltage instead of supplying it with a sinusoidal AC voltage. If the X-ray is supplied with a sinusoidal voltage, the X-ray spectrum emitted will contain a great number of different radiation hardenesses. By supplying the tube with a pulsating DC voltage, a significantly smaller number of different radiation hardnesses are obtained and, moreover, the high-tension transformer is more effectively utilized.

The controllable rectifier will normally be a thyristor which, as is known, has the characteristic that it is impossible to extinguish it by means of a signal applied to the control electrode, but that extinction requires the current passing through the thyristor being essentially brought down to the value zero. The two timing devices are so that when a given, possibly adjustable period of time has elapsed, after their function has been initiated by a function control voltage having been supplied, they supply a signal for the ignition of the controllable rectifier and the switching of the controllable switch, respectively.

In a known circuit arrangement of the type dealt with, the voltage across the load is used as a function control voltage for the second timing device. This entails that the period of time which is determined by the second timing device and which determines the width of the pulse, always begins at the moment at which the load current starts, that is to say at the leading edge of the pulse. It is possible, in a similar manner, to utilize the voltage across the controllable rectifier as a function control voltage for the first timing device.

The said method for controlling the second timing device is subject to certain drawbacks in cases of extreme loads, e.g. in the case of a short circuiting. In this case, the voltage across the load disappears or it is reduced to a negligible value, so that the starting of the function of the second timing device does not take place. Consequently, the controllable rectifier is not extinguished and the great short circuiting current passes continuously through the rectifier.

The said drawback is eliminated according to the present invention in that the functioning of the second timing device is controlled by the voltage across the commutation capacitor. The voltage across the commutation capacitor will also be present in the case of a short circuiting and it is hereby ensured that the second timing device will also function in this case. It is hereby certain that a control pulse is supplied to the controllable switch and that an attempt is hereby made to extinguish the controllable rectifier, but since the short circuiting current, at the moment of extinction, is so great that the associated commutation circuit normally does not contain sufficient energy for extinguishing it, a permanent short circuiting current will pass through the rectifier and the fuse of the circuit arrangement will melt. Since in X-ray devices in operation, there will often be brief short circuitings (e.g. due to flashovers) of the supply voltage source which, however, are of no harm to the functioning of the tube, it is expedient that these brief disturbances do not lead to the melting of the fuse. In order to obviate this drawback, the second timing device may according to the invention be arranged in such a way that its time constant is reduced when its function control voltage exceeds a given value. As a consequence of the commutation capacitor being charged by means of a current transformer, the voltage across the capacitor is going to increase with the load current and when this voltage has reached a given value, the time constant is reduced, which means that the pulse width is reduced. By means of an appropriate adaptation and dimensioning it can be achieved that the second timing device, in the event of a short circuiting extinguishes the controllable rectifier so rapidly after the initiation of each pulse that the current never reaches a harmful value.

In the following, the invention is explained in greater detail with reference to the schematic drawing, in which FIG. 1 is a diagram of a known circuit arrangement for supplying current from a battery to an X-ray tube.

Figure 2:
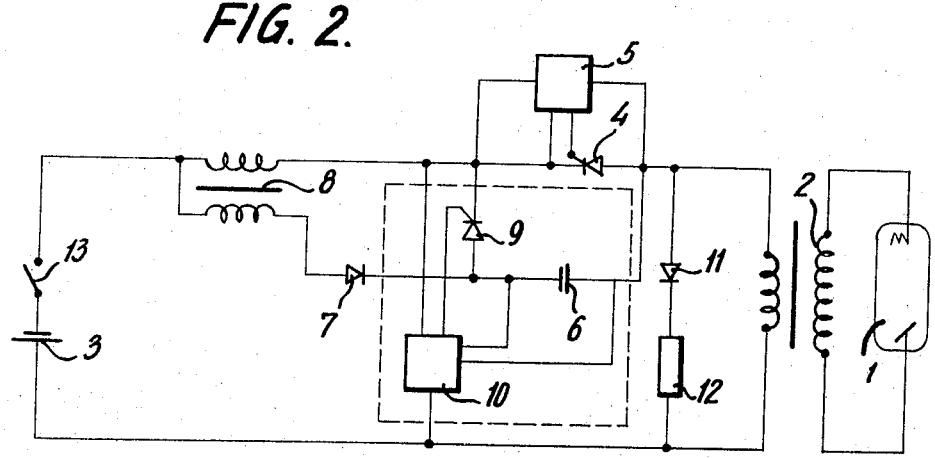
Figure 3:
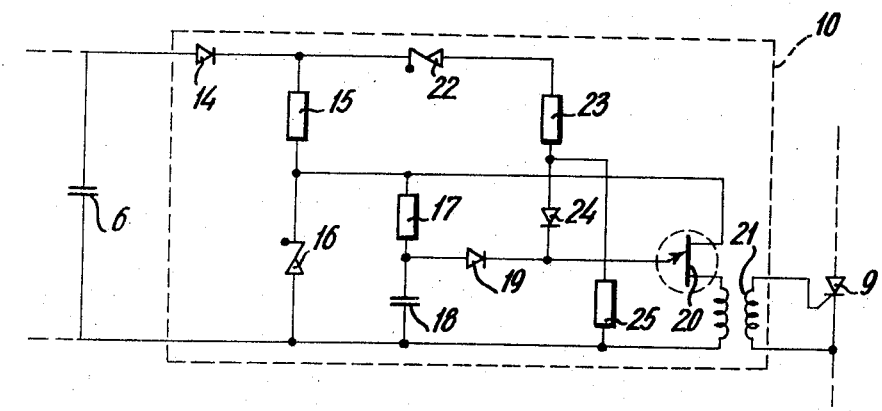

FIG. 2 is a diagram of a circuit arrangement for the same purpose, but arranged in conformity with the present invention, and FIG. 3 is a more detailed diagram of a part of the circuit arrangement shown in FIG. 2.

In the different figures, analogous components are denoted with the same reference designations.

In the circuit arrangement shown in FIG. 1, an X-ray tube 1 is supplied with current via a high-tension transformer 2 from a battery 3 via a thyristor 4 which transforms the DC voltage from the battery 3 into a pulsating voltage. The thyristor 4 is ignited by means of a first timing device 5 which is powered by means of the voltage across the thyristor 4 and which emits a pulse for igniting the thyristor 4 after a certain, possibly adjustable, period of time has elapsed after the beginning of the supply voltage.

For extinguishing the thyristor 4, the circuit arrangement comprises a commutation capacitor 6 which, via a rectifier 7 and a current transformer 8 is charged by means of the load current. The discharging of the capacitor is effected by means of a controllable switch which, in this case, is constituted of a second thyristor 9 which is ignited by means of a second timing device 10 which is powered by means of the voltage across the load. This timing device is adapted in such a way that after a given period of time, subsequent to the supply voltage having been applied, that is to say after the load current has started, it supplies a signal for the ignition of the thyristor 9.

In order to avoid too high voltages across the high-tension transformer 2 when the load current is interrupted, a series connection of a diode 11 and a resistor 12 is coupled parallel to the primary winding of the transformer.

The circuit arrangement in FIG. 1 operates in the following manner.

When the battery voltage is applied by means of the switch 13, the timing device 5 is supplied with supply voltage. After the lapse of the period of time determined by the timing device 5, the thyristor 4 is ignited, whereupon load current starts passing through the high-tension transformer 2 and the current transformer 8. The commutation capacitor 6 is charged by means of the latter via the rectifier 7. At the moment when the load current starts, the timing device 10 is supplied with voltage and after the lapse of the period of time which is determined by the timing device 10, the thyristor 9 is ignited whereby the voltage across the capacitor 6 is laid across the thyristor 4 in the blocking direction, and at the same time the load current passes temporarily through the capacitor 6 and the thyristor 9, whereby the thyristor 4 is extinguished. This extinction has the effect of supply voltage again being fed to the timing device 5, whereupon the sequence described is repeated.

The circuit described possesses, inter alia, the following advantages.

1. Since the transformer 8 is a current transformer, the commutation voltage applied to the capacitor 6 will be proportional to the load current that is to be commutated, which will have as a consequence that an approximately constant period of extinction arises, that is to say, the period of time in which the current passing through the thyristor has to have the value zero for ensuring that the thyristor does not re-ignite when voltage is applied again across the thyristor. This extinction period is termed "turn-off time".

2. The control of the function of the timing devices by means of the voltages across the thyristor 4 and the load, respectively, provides the certainty of a correct ignition sequence and dependable functioning.

These advantages are, however, not obtained in cases of extreme loads. Point 1 thus is only correct for so long as the transformer 8 operates within the saturation limit and in the event of a short circuiting, this transformer will not be capable of supplying sufficient energy to the capacitor 6 for commutating the thyristor 4 and a permanent short circuiting will arise through this thyristor. Point 2 is also only correct outside the short circuiting range, as, when there is a short circuiting, no supply voltage for the timing device 10 will be present, which timing device consequently will be incapable of igniting the thyristor 9 and will, therefore, not initiate any extinction of the thyristor 4 either.

These drawbacks are obviated in the circuit arrangement shown in FIGS. 2 and 3. FIG. 3 shows in detail the part of the circuit arrangement in FIG. 2 which is framed with a dotted rectangle.

In the circuit arrangement shown in FIG. 2, the timing device 10 is powered by the voltage across the commutation capacitor 6 and not the voltage across the load. The voltage across the capacitor 6 appears at the initiation of each current pulse, irrespective of whether a short circuiting exists and the timing device 10 is consequently capable of igniting the thyristor 9 after the period of time determined by the timing device 10 has elapsed. As mentioned, the danger exists of the energy stored in the capacitor 6 not being sufficiently powerful for extinguishing the thyristor 4 in the event of a short circuiting, but this drawback is eliminated by means of a special construction of the timing device 10, which is made possible, inter alia, by supplying the timing device with the voltage across the capacitor 6 which depends upon the load current.

As appears from FIG. 3, the voltage across the capacitor 6 is applied to the series connection of a resistor 15 and a zener diode 16 via a rectifier 14. A constant voltage appears across the zener diode which voltage, via a resistor 17, charges a capacitor 18. The voltage across the capacitor 18 is applied through a diode 19 to the emitter of a unijunction transistor 20, which, when the voltage across the capacitor 18 reaches a certain value, supplies an ignition pulse to the thyristor 9 via a transformer 21. This is the normal functioning of the timing device. However, if the load current rises above the permissible value, for example in the event of a short circuiting in the load, the voltage across the capacitor 6 also increases which results in a zener diode 22 becoming conductive, so that, via a resistor 23 and a rectifier 24, a trigger voltage is rapidly applied to the emitter of the unijunction transistor 20. A resistor 25 prevents the transistor from being triggered by the lead current passing via the zener diode 22.

The circuit arrangement described may be made to react so rapidly with respect to great voltages across the commutation capacitor 6 that the thyristor 4 is extinguished before the short circuiting current has reached such a value that the transformer 8 is saturated and it is ensured hereby that the capacitor 6 at all times disposes of sufficient energy so as to ensure the extinction of the thyristor 4. It is thus achieved that, right up to short circuiting, proportionality exists between the available commutation voltage and the instantaneous value of the load current at the moment of commutation, which means that an at least approximately constant period of extinction is obtained.

Another breakdown element than the shown unijunction transistor may be employed as a trigger element 20. The zener diode 22, too, may be replaced by another breakdown element.

What we claims is:

1. A circuit arrangement for transforming a DC voltage into a pulsating voltage including DC source, a load and controllable rectifier serially connected to said source, a first timing device for controlling the ignition times of said controllable rectifier, a series connected commutation capacitor and controllable switch coupled in parallel with said controllable rectifier, the improvement comprising:

a current transformer and rectifier for charging said commutating capacitor from the load current; and second timing means, responsive to the potential across the commutating capacitor, for controlling the ignition times of said controllable switch, said second timing means including i. a time constant circuit including a time constant capacitor
   ii. a first breakdown element coupled to said time constant capacitor, said breakdown element providing a path for the discharge of said commutating capacitor when said time constant capacitor charges to a predetermined level, and
   iii. a second breakdown element coupled to said first breakdown element for causing said first breakdown element to be triggered when the potential across said commutating capacitor exceeds a predetermined amount, independent of the charge on said time constant capacitor.

2. The circuit arrangement of claim 1 wherein said time constant circuit includes a serially connected resistance and capacitance circuit, said capacitance forming the time constant capacitor, coupled across the commutating capacitor, the potential across said time constant capacitor being applied to a control electrode of said first breakdown element, the output of said first breakdown element being coupled to said controllable switch.

3. The circuit arrangement of claim 2 wherein said second breakdown element is a zener diode, one terminal of which is coupled to said commutating capacitor, another terminal of which is coupled to said control electrode.

4. The circuit arrangement of claim 3 wherein said time constant circuit further includes a zener diode coupled in parallel with a series circuit formed of the time constant capacitor and a portion of said resistance means.

5. The circuit arrangement of claim 4 wherein said controllable switch is coupled to said first breakdown element through transformer means.

* * * * *